United States Patent
Usami et al.

(10) Patent No.: US 7,303,633 B2
(45) Date of Patent: Dec. 4, 2007

(54) APPARATUS FOR PRODUCING OPTICAL INFORMATION RECORDING MEDIUM

(75) Inventors: Yoshihisa Usami, Kanagawa (JP); Koichi Kawai, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/119,757

(22) Filed: May 3, 2005

(65) Prior Publication Data
US 2005/0191414 A1   Sep. 1, 2005

Related U.S. Application Data

(62) Division of application No. 10/167,406, filed on Jun. 13, 2002, now abandoned.

(30) Foreign Application Priority Data

Jun. 15, 2001   (JP) .............................. 2001-182062

(51) Int. Cl.
*B05C 11/02*   (2006.01)
*B05B 1/28*    (2006.01)
*B08B 3/02*    (2006.01)

(52) U.S. Cl. .................. 118/52; 118/320; 118/326; 134/153; 134/198; 134/148

(58) Field of Classification Search .............. 118/52, 118/612, 319, 320, 326; 134/198, 902, 153, 134/147–148; 396/604, 611
See application file for complete search history.

(56) References Cited

U.S. PATENT DOCUMENTS

| | | | |
|---|---|---|---|
| 4,510,176 A | 4/1985 | Cuthbert et al. | |
| 5,424,102 A | 6/1995 | Mizukuki et al. | |
| 5,688,555 A | 11/1997 | Teng | |
| 5,952,050 A | 9/1999 | Doan | |
| 6,004,047 A * | 12/1999 | Akimoto et al. | 396/604 |
| 6,033,728 A * | 3/2000 | Kikuchi et al. | 427/240 |
| 6,420,007 B2 | 7/2002 | Usami | |
| 6,516,815 B1 | 2/2003 | Stevens et al. | |

FOREIGN PATENT DOCUMENTS

| | | |
|---|---|---|
| JP | 2000-285528 | 10/2000 |
| JP | 2000-331387 | 11/2000 |
| JP | 2001-297492 | 10/2001 |

* cited by examiner

*Primary Examiner*—Yewebdar Tadesse
(74) *Attorney, Agent, or Firm*—Sughrue Mion Pllc.

(57) ABSTRACT

A method for producing an optical information recording medium includes the steps of: coating a solution for forming a dye recording layer onto a surface of a rotating disc-shaped resin substrate; and discharging a cleaning solution from a nozzle onto a peripheral edge to remove the dye recording layer from the peripheral edge, wherein discharge of the cleaning solution is initiated 1.0 to 300 seconds after completion of the coating, and the nozzle is disposed on a plane that extends in a normal line direction of the substrate and includes a straight line representing a discharge direction of the cleaning solution, so that an angle defined by the discharge direction and the normal line is 0 to 60°.

9 Claims, 10 Drawing Sheets

FIG.IIA

FIG.IIB

FIG.IIC

FIG.IID

APPARATUS FOR PRODUCING OPTICAL INFORMATION RECORDING MEDIUM

This is a divisional of application Ser. No. 10/167,406 filed Jun. 13, 2002, now abandoned;

BACKGROUND OF THE INVENTION

1. Field of the Invention

The present invention relates to a method for producing an optical information recording medium, and more particularly, to a method for producing an optical information recording medium that includes a disc-shaped resin substrate having a peripheral edge disposed with an non-recording region.

2. Description of the Related Art

A CD-R is a writable, optical information recording medium (optical disc) on which information can be written only once by irradiation with laser light, and is widely known. CD-Rs are advantageous in that, in comparison with conventional CDs in which information is recorded by forming pits on a substrate by injection molding, a small number of CDs can be manufactured rapidly and at a reasonable cost. Moreover, the demand for CD-Rs has been escalating recently with the spread of personal computers.

CD-Rs typically comprise a transparent disc substrate having successively disposed thereon a recording layer formed of an organic dye, a metallic (e.g., gold) reflective layer, and a resin protective layer. Information is recorded on the optical disc by irradiating the optical disc with a laser in the near infrared region (ordinarily laser light having a wavelength in the vicinity of 780 nm). Specifically, the portion of the dye recording layer that is irradiated absorbs the light, whereby temperature increases at the irradiated portion. The local increase in temperature deforms the recording layer (e.g., to form pits) at the irradiated portion, whereby information is recorded. The recorded information is ordinarily reproduced by irradiating the optical disc with a laser having the same wavelength as that of the laser used to record the information, and by detecting a difference in reflectance between the region of the recording layer that has been thermally deformed (recorded portion) and the region of the recording layer that has not been deformed (unrecorded portion).

Recently, writable digital versatile discs (DVD-Rs) have also been put to practical use as media having a larger recording capacity than CD-Rs. DVD-Rs typically comprise two transparent disc substrates that each have successively disposed thereon a recording layer formed of an organic dye, a reflective layer, and a resin protective layer, with the discs being adhered together so that the recording layers face inward, or comprise the transparent disc substrate and a protective substrate having the same disc shape as the disc substrate that are adhered together. In each transparent disc substrate, there is formed a guide groove (pre-groove) for tracking laser light irradiated during recording. The pre-groove has a width (0.74 to 0.8 μm) that is equal to or less than half the width of the pre-groove of a CD-R.

The outer peripheral edge of a CD-R or DVD-R is a non-recording region where no dye recording layer is disposed. The purpose of the non-recording region is to improve the outer appearance of the disc by covering the dye recording layer with the reflective layer, and to enhance adhesion by directly adhering the protective layer to the substrate. The dye recording layer is formed by spin-coating a dye solution onto the surface of the substrate and drying the dye solution. However, although it is possible to initiate spin coating so that the spin coater begins coating from a somewhat limited position at the inner periphery of the substrate, it is difficult to control the range of coating towards the outer periphery. For this reason, the dye recording layer is generally first disposed on the entire surface of the substrate, and then cleaning solution is jetted onto the dye recording layer at the outer peripheral edge to remove the dye recording layer from the outer peripheral edge and create the non-recording region.

There are generally two ways that the non-recording region is formed in this manner during the process of producing the optical disc. One is by washing/removing the dye recording layer immediately after it has been formed, and the other is by washing/removing the dye recording layer after both it and the reflective layer have been formed. Below, the former may be called "earlier washing" and the latter may be called "later washing".

In the case of earlier washing, there are problems in that droplets of the cleaning solution may be scattered onto portions of the recording layer that are not to be removed, whereby those portions are dissolved and recording errors occur at those portions during recording or playback.

In the case of later washing (i.e., when the dye recording layer is formed by spin-coating the dye solution onto the surface of the substrate and allowing the dye solution to dry, and washing is conducted after the reflective layer is formed only on the recording region of the dye recording layer), the non-recording region is formed by washing only the portion of the recording layer disposed at the outer peripheral edge, where the reflective layer is not formed. However, practical problems arise in that the shape of the edge of the recording layer may become irregular depending upon washing conditions. In addition, because time lapses after coating the dye recording layer, there is the problem that it takes time wash the recording layer.

It is possible to prevent the cleaning solution from being scattered and adhering to the dye recording layer by pre-forming the non-recording region by spin-coating the dye solution onto the surface of the substrate except for the outer peripheral edge and allowing the dye solution to dry to thereby form the dye recording layer, and then washing after the reflective layer has been formed on the dye recording layer. However, because it is difficult to control the range of coating towards the outer periphery of the substrate, the dye recording layer intrudes into the area where the substrate and the reflective layer should ordinarily be closely adhered together, which reduces adhesion between the substrate and the reflective layer. When adhesion is reduced in this manner, water or oxygen may intrude from outside into the dye recording layer, whereby storage stability of the recording medium is reduced.

SUMMARY OF THE INVENTION

The present invention was devised in view of the preceding problems in the prior art. It is an object of the invention to provide a method for producing an optical information recording medium in which cleaning solution is prevented from being scattered and adhering to a dye recording layer when the dye recording layer is removed from an outer periphery of the medium by washing, to thereby efficiently form a non-recording region and produce an optical information recording medium that has excellent storage stability and excellent recording and playback characteristics.

This object is achieved by the following means.

According to a first aspect of the invention, there is provided a method for producing an optical information recording medium, comprising at least the steps of: coating a solution for forming a dye recording layer onto a surface of a rotating disc-shaped resin substrate; and discharging a cleaning solution from a nozzle onto a peripheral edge to remove the dye recording layer from the peripheral edge, wherein discharge of the cleaning solution is initiated 1.0 to 300 seconds after completion of the coating, and the nozzle is disposed on a plane that extends in a normal line direction of the substrate and includes a straight line representing a discharge direction of the cleaning solution, so that an angle defined by the discharge direction and the normal line is 0 to 60°.

According to a second aspect of the invention, there is provided a method for producing an optical information recording medium, comprising at least the steps of: coating a solution for forming a dye recording layer onto a surface of a rotating disc-shaped resin substrate; coating a reflective layer on the formed dye recording layer; and discharging a cleaning solution from a nozzle onto a peripheral edge to remove the dye recording layer from the peripheral edge, wherein discharge of the cleaning solution is started 1.0 to 300 seconds after completion of the coating of the reflective layer, and the nozzle is disposed on a plane that extends in a normal line direction of the substrate and includes a straight line representing a discharge direction of the cleaning solution, so that an angle defined by the discharge direction and the normal line is 0 to 60°.

DETAILED DESCRIPTION OF THE PREFERRED EMBODIMENTS

Hereinafter, embodiments of a method for producing an optical information recording medium according to the present invention will be explained in detail with reference to the drawings.

Figure 1:
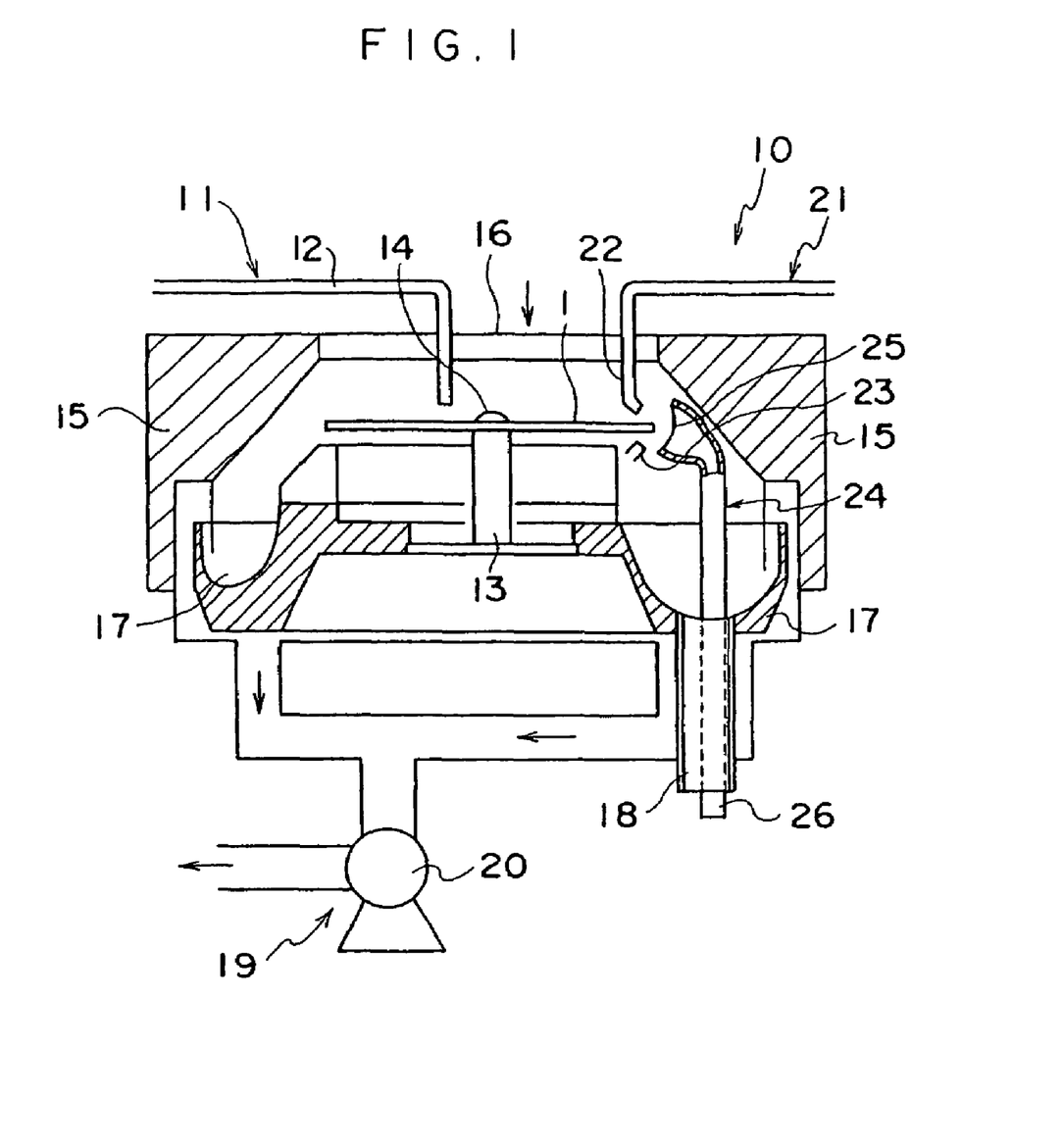
FIG. 1 is a schematic sectional view illustrating a spin coater used in embodiments of the present invention.

FIG. 1 is a sectional view of a spin coater 10 used in the method of the invention. As illustrated in FIG. 1, the spin coater 10 comprises an applicator 11, a spinner head 13, a wall 15 for preventing scatter, an exhaust device 19, a washing device 21, and a waste recovery device 24. The spin coater 10 illustrated in FIG. 1 can coat a dye recording layer and remove the dye recording layer from an outer peripheral edge of a disc resin substrate 1.

The applicator 11 comprises a nozzle 12 that includes a pressure tank (not illustrated) and a valve (not illustrated) for controlling discharge amount. The nozzle 12 drops a predetermined amount of coating solution onto a surface of the substrate 1. The applicator 11 is moved by means of a handling mechanism (not illustrated) from a standby position to a predetermined position above the substrate 1. The spinner head 13 is disposed below the applicator 11, includes a detachable fixing member 14 for keeping the substrate 1 horizontal, and is rotated by a drive motor (not illustrated). The substrate 1 is rotated by the spinner head 13 so that coating solution dropping onto the substrate 1 from the nozzle 12 is horizontally flown across the surface of the substrate 1 toward the outer periphery of the substrate 1 to form a coating film. Excess coating solution is spun away from and runs off of the outer peripheral edge of the substrate. Once the coating solution film has dried, a coating film is formed on the surface of the substrate 1. The wall 15 prevents excess coating solution (waste solution) spinning off from the outer peripheral edge of the substrate 1 from being scattered around the substrate 1. The wall 15 is disposed around the spinner head 13, with an opening 16 being formed above the spinner head 13.

Waste solution collects in a pan 17 disposed beneath the wall 15 and is recovered through a drain 18. The exhaust device 19 allows air to circulate in from the opening 16, over the surface of the substrate 1, and then to below the spinner head 13. The exhaust device 19 includes a valve (not illustrated) for adjusting exhaust amount and a fan 20. By adjusting the amount of exhaust (speed of exhaust), drying conditions for the coating film can be changed.

The washing device 21 comprises two nozzles 22 and 23 that include a pressure tank (not illustrated) and a value (not illustrated) for adjusting discharge amount. The two nozzles 22 and 23 jet cleaning solution at a predetermined pressure onto the outer peripheral edge of the dye recording layer on the substrate 1, and can discharge the cleaning solution independently. Washing can therefore be performed using either one or both of the nozzles 22 and 23. Similar to the applicator 11, the washing device 21 is moved by a handling mechanism (not illustrated) from a standby position to a predetermined position during washing, and can alter the direction in which the cleaning solution is discharged.

Figure 2:
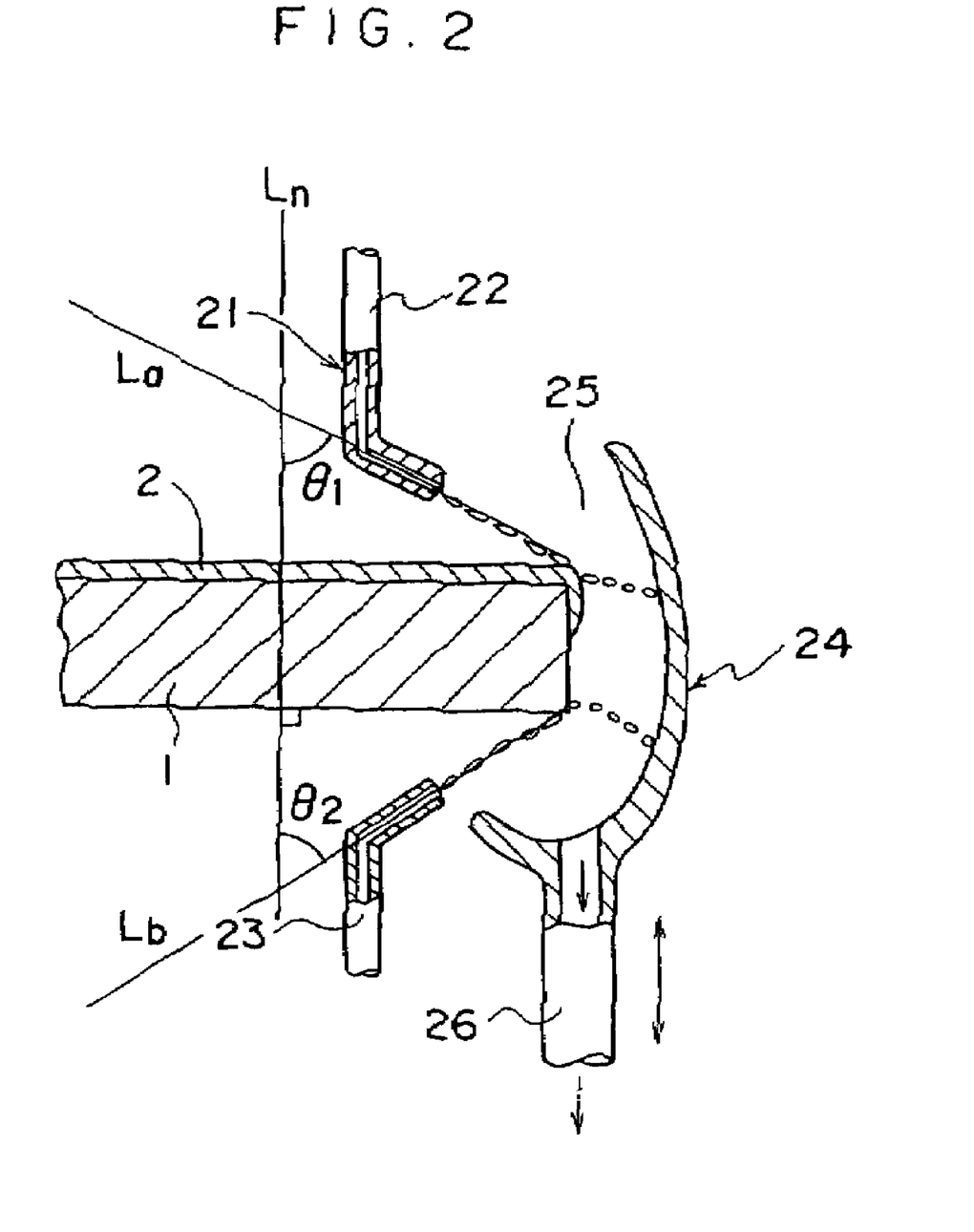
FIG. 2 is an enlarged sectional view of a washing device and a waste recovery device used in the embodiments.
Figure 3:
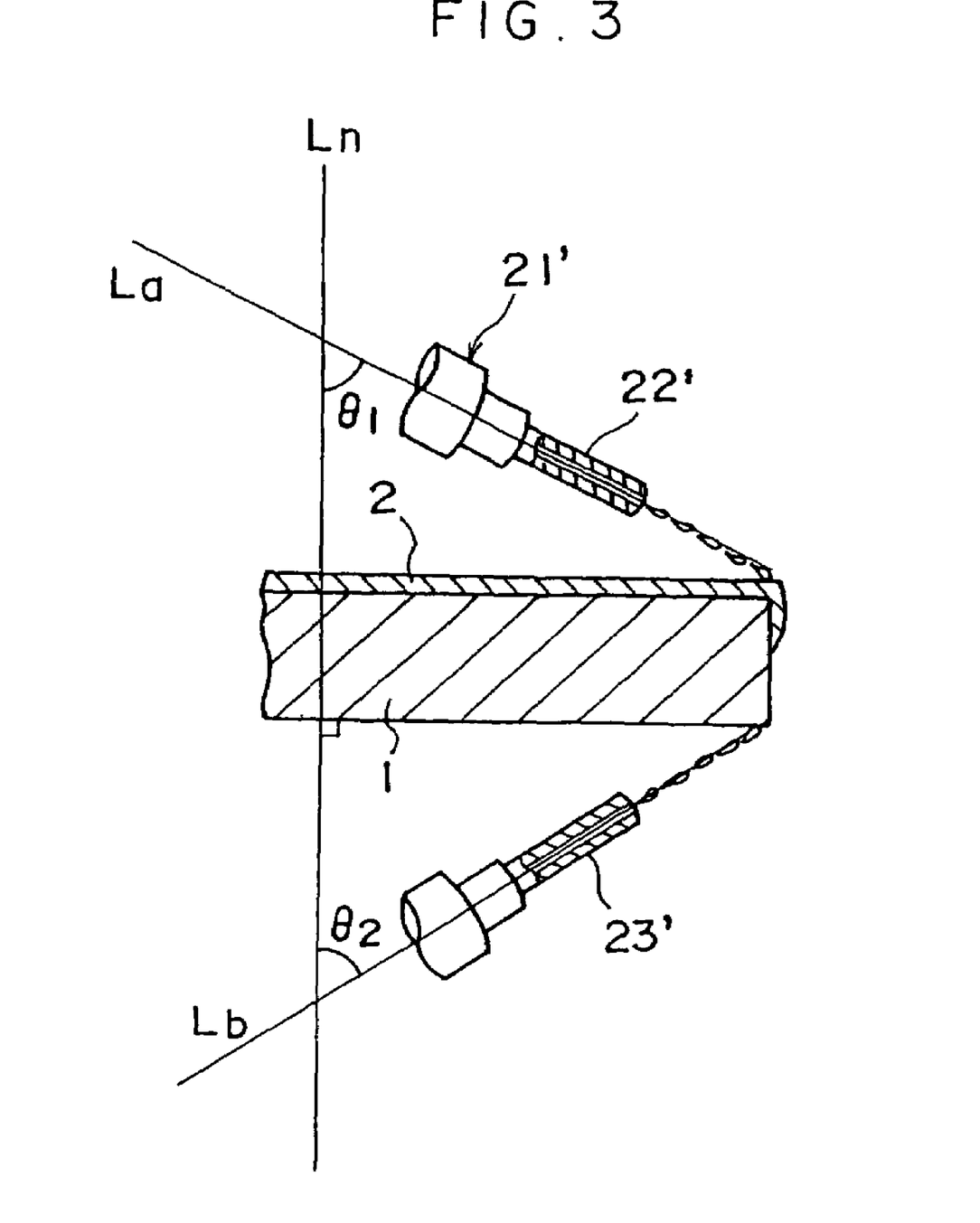
FIG. 3 is an enlarged sectional view illustrating a washing device that is different from the washing device illustrated in FIG. 2.
Figure 4:
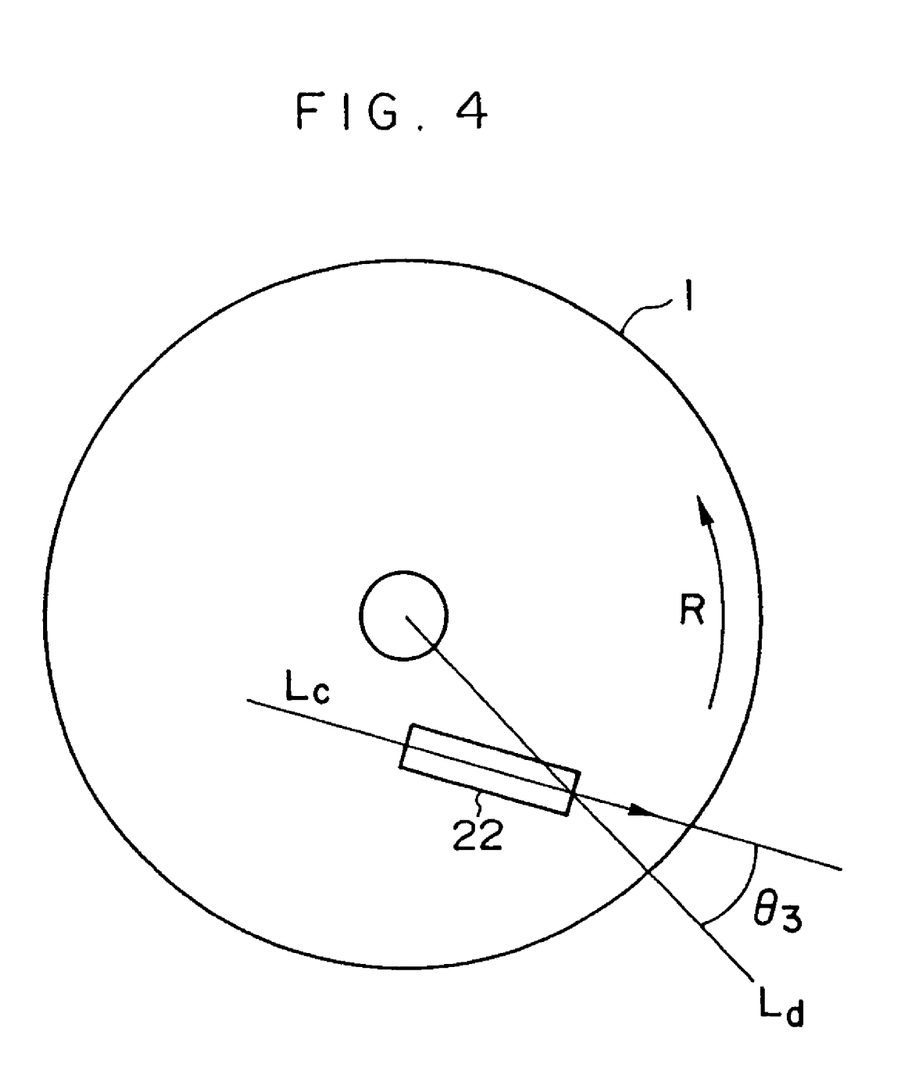
FIG. 4 is a plan view for illustrating a position at which a nozzle is disposed relative to a substrate.

The washing device 21 will be now be described in detail with reference to FIGS. 2 to 4. FIG. 2 is an enlarged sectional view illustrating the washing device 21 and the waste recovery device 24. FIG. 3 is an enlarged sectional view illustrating a washing device 21' that is different from the washing device illustrated in FIG. 2. FIG. 4 is a schematic plan view illustrating a position at which the nozzle 22 is disposed. FIGS. 2 and 3 are each views seen from the side of a plane extending in a normal line direction of the substrate 1 (i.e., orthogonal to the substrate 1) and including a straight line representing the direction in which the cleaning solution is discharged from the nozzles 22 and 23.

As illustrated in FIG. 2, the nozzles 22 and 23 are bent so that the cleaning solution is obliquely jetted onto the substrate 1. However, the configuration of the nozzles 22 and 23 is not limited to the configuration shown in FIG. 2 as long as the conditions below concerning the discharge direction of the cleaning solution are met.

For preventing the cleaning solution from splattering, as illustrated in FIG. 2, the nozzles 22 and 23 are disposed so that angles $\theta_1$, $\theta_2$, which are defined by the intersection between a normal line $L_n$ of the substrate 1 and directions $L_a$ and $L_b$ in which the cleaning solution is discharged from the nozzles 22 and 23, are each 0 to 60°, and preferably 10 to 45°. The angle at which the nozzles 22 and 23 are bent is adjusted to meet this condition.

Although the nozzles 22 and 23 illustrated in FIG. 2 are bent, they may have, for example, a straight configuration such as nozzles 22' and 23' in FIG. 3. In order to discharge the cleaning solution within the angle range described below, the nozzles 22' and 23' are connected to the spin coater 10 via a valve (not illustrated) having an angle-adjusting function or a member (not illustrated) having an angle-adjusting function.

As illustrated in FIG. 3, the nozzles 22', 23' are disposed so that angles $\theta_1$, $\theta_2$, which are defined by the intersection between the normal line $L_n$ of the substrate 1 and directions $L_a$ and $L_b$ in which the cleaning solution is discharged from the nozzles 22' and 23', are each 0 to 60°, and preferably 10 to 45°. The angle at which the nozzles 22' and 23' are disposed is adjusted to meet this condition.

Although the bent nozzles 22 and 23 and the straight nozzles 22' and 23' discharge the cleaning solution in the above-described angle range, they are at least disposed so that the discharge direction of the cleaning solution is directed away from the center of the substrate 1. In addition, the range of the angles $\theta_1$ and $\theta_2$ is defined on the plane extending in a normal line direction of the substrate 1 and including the straight line representing the direction in which the cleaning solution is discharged.

As illustrated in FIG. 4, the nozzle 22 (and 23 or 22' and 23') is, when seen from above, additionally disposed so that an angle $\theta_3$, which is defined by the intersection between a straight line Ld connecting the center of the substrate 1 with a mouth of the nozzle 22 and a cleaning solution discharge direction $L_c$ facing in the direction of rotation R, is preferably 0 to 60°, and more preferably 10 to 45°.

In addition, the distance between the mouth of the nozzle 22 (or 23, 22', 23') and the substrate 1 is preferably 0.3 to 5.0 mm, more preferably 0.5 to 3.0 mm, and even more preferably 0.7 to 2.0 mm. The diameter of the nozzle is preferably 0.1 to 0.8 mm, and more preferably 0.2 to 0.6 mm, in order to stably discharge the cleaning solution.

Although description has been given of the washing device 21, which is disposed with an upper nozzle (22) and a lower nozzle (23), the washing device 21 may be one disposed with only one nozzle. In this case, the washing device 21 preferably includes a handling mechanism to move the one nozzle so that the coating solution is discharged from both above and below the outer peripheral edge of the substrate 1 (the coating film). The washing device 21 may also be disposed with many nozzles. However, because increasing the number of nozzles results in an increase in the amount of cleaning solution used and may cause more splattering of the cleaning solution, the number of nozzles is preferably 1 to 4, and more preferably 1 or 2. Also, since the method of the invention includes two washing steps, the diameter of the nozzle and the number of nozzles may be changed for each step.

In order to recover the post-wash liquid (containing the cleaning solution and the dye-containing components removed by that cleaning solution), the waste recovery device 24 includes a drain 26 having an opening 25 that faces the direction in which the liquid is scattered. As seen in FIGS. 1 and 2, the waste recovery device 24 is independently disposed so that the drain 26 is accommodated within the drain 18. Accordingly, the post-wash liquid (waste liquid) is gathered into the opening 25 and is recovered through the drain 26 separately from the waste coating solution. It is to preferable to dispose the waste recovery device 24 with a mechanism for vertically moving the waste recovery device 24. By moving the waste recovery device 24 to a lower standby position when the dye recording layer is being formed, the waste coating solution (e.g., the scattered dye-containing coating solution) can be recovered without being obstructed by the waste recovery device 24.

Method for Producing Optical Disc (1)

Description will now be given of a first embodiment of the method of the invention applied to the spin coater 10 (FIG. 1) disposed with the washing device 21 and waste recovery device 24. FIGS. 5A to 5D illustrate steps in the method, which in this embodiment is for forming the non-recorded region by earlier washing.

Figure 6:
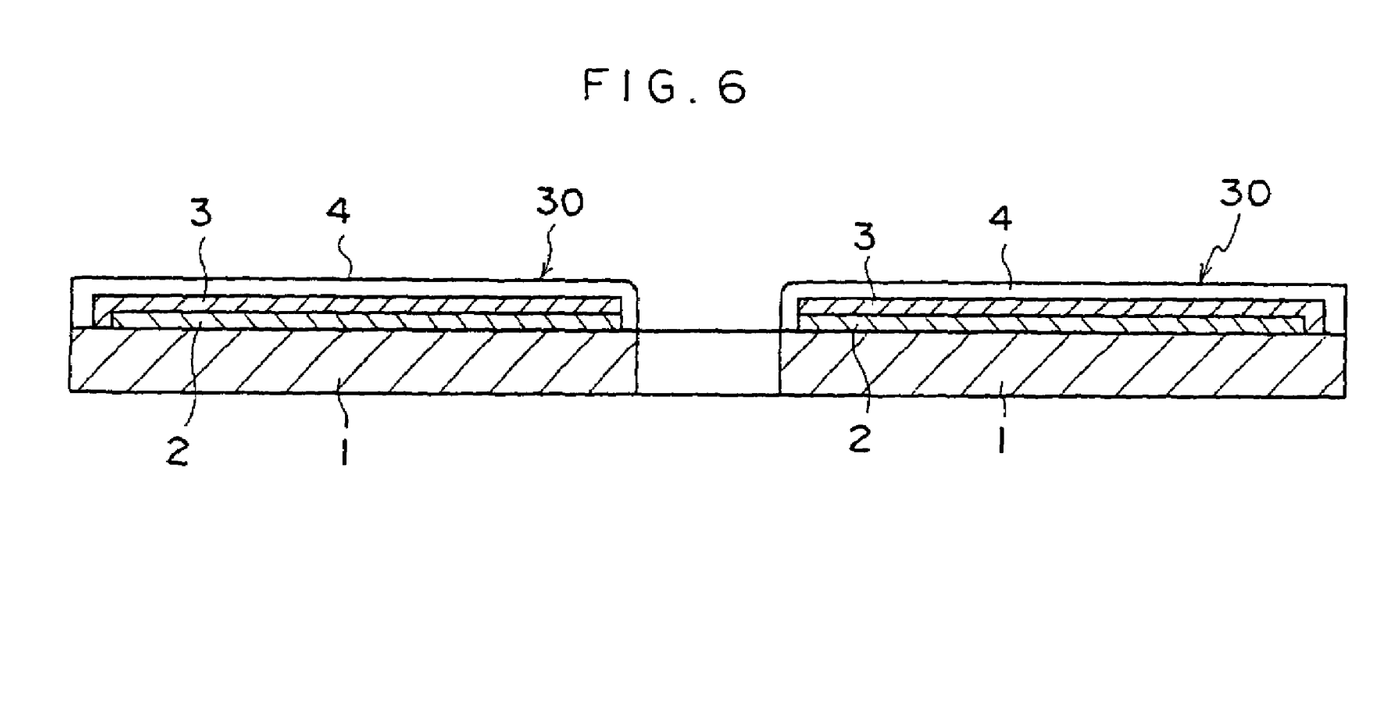
FIG. 6 is a sectional view illustrating the structure of a general CD-R disc.

FIG. 6 illustrates an optical disc (CD-R) 30 comprising the disc-shaped transparent resin substrate 1 having successively disposed thereon a dye recording layer 2, a reflective layer 3, and a protective layer 4. Because this type of optical disc is common, the method will be described using the optical disc 30 as an example. However, the method can also be applied to a DVD-R.

Examples of material usable for the substrate 1 include polycarbonate, acrylic resins such as polymethyl methacrylate, vinyl chloride resins such as polyvinyl chloride and vinyl chloride copolymer, epoxy resins, amorphous polyolefins, and polyester. These materials may be concurrently used as desired. The material used is preferably transparent. In particular, polycarbonate is preferable in view of resistance to moisture, dimensional stability, and cost.

The substrate 1 includes a guide groove for tracking or a pre-groove representing information such as address signals. The pre-groove is preferably formed directly in the substrate when the resin material is injection molded or extrusion molded, and preferably has a depth 0.01 to 0.3 μm and a half width of 0.2 to 0.9 μm.

On the surface of the substrate 1 at the side at which the dye recording layer 2 is disposed, an undercoat layer may be provided for the purpose of improving flatness and adhesive force, and preventing deterioration of the dye recording layer 2. Examples of suitable material for the undercoat layer include macromolecular materials such as polymethyl methacrylate, acrylic acid/methacrylic acid copolymer, stylene/maleic anhydride copolymer, polyvinl alcohol, N-methylol acrylamide, stylene/vinyltoluene copolymer, chlorosulfonated polyethylene nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate, and a surface modifier such as a silane coupling agent. The undercoat layer can be formed by dissolving or dispersing the material into a suitable solvent to prepare a coating solution, and thereafter coating the coating solution onto the surface of the substrate by spin-coating, dip-coating, or extrusion-coating. The thickness of the undercoat layer is generally 0.005 to 20 μm, and preferably 0.01 to 10 μm.

Figure 5A:
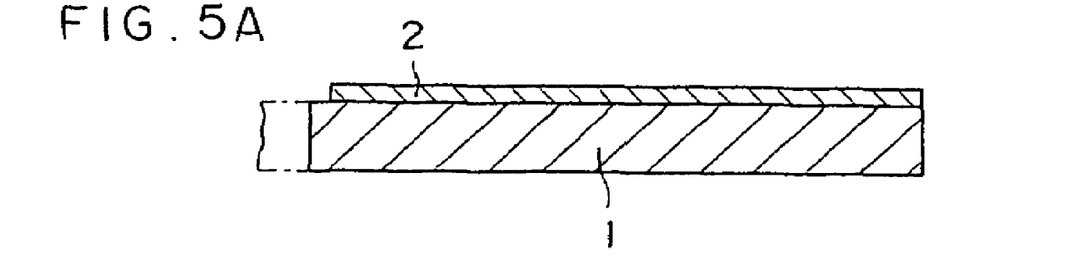
FIGS. 5A to 5D are sectional views illustrating steps in a process for producing an optical disc in accordance with a first embodiment of the invention.

As illustrated in FIG. 5A, the dye recording layer 2 is disposed on the substrate 1 using the spin coater 10 according to the invention. When the dye recording layer 2 is formed, the washing device 21 and the waste recovery device 24 have been moved to standby positions by handling mechanisms (not illustrated) so that they do not become obstacles. The substrate 1 is mounted on, for example, the spinner head 13 illustrated in FIG. 1, and horizontally held in place by the fixing member 14. Next, coating solution supplied from the pressure tank (not illustrated) is adjusted to a predetermined amount by the valve (not illustrated) and dropped onto the inner periphery of the substrate 1 through the nozzle 12. Here, the coating solution is a dye solution in which a dye has been dissolved in a suitable solvent. The concentration of the dye in the coating solution is generally 0.01 to 15 mass %, preferably 0.1 to 10 mass %, more preferably 0.5 to 5 mass %, and most preferably 0.5 to 3 mass %.

Figure 7:
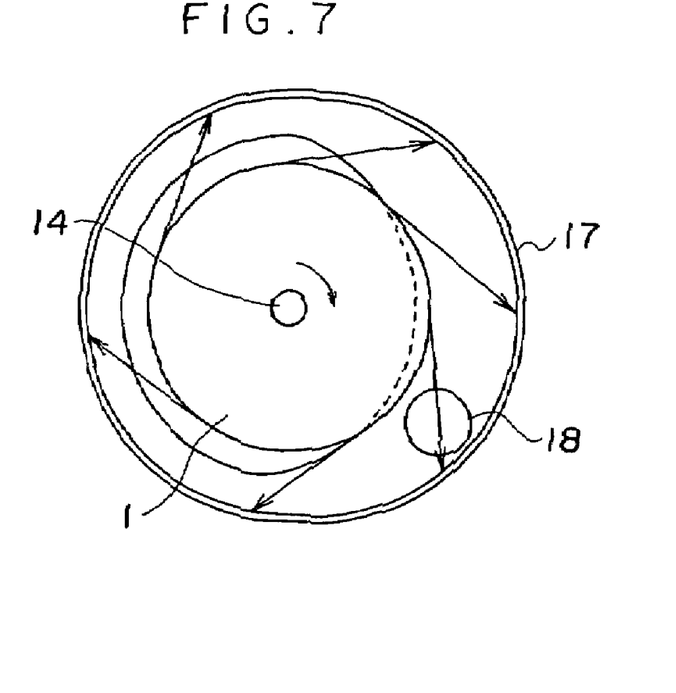
FIG. 7 is a plan view illustrating the manner in which coating solution is spun off.

The spinner head 13 is drivingly rotated by the drive motor at high speed, whereby coating solution falling onto the substrate is spun across the surface of the substrate 1 and towards the outer periphery of the substrate 1 to form a coating film. Excess coating solution is spun off of the substrate 1 by centrifugal force, scattered around the substrate 1, collides against the wall 15, is collected in the pan 17, and is thereafter recovered through the drain 18. FIG. 7 is a typical view illustrating excess coating solution (indicated by the arrows), which has reached the outer periphery of the substrate 1, being omnidirectionally spun off of the substrate 1 by centrifugal force, scattering around the substrate 1, and colliding against the wall. The coating film is dried by the exhaust device 19 during and after the process of forming the coating film. The thickness of the coating film (the dye recording layer) is generally 20 to 500 nm, and preferably 50 to 300 nm.

The dye used in the dye recording layer is not particularly limited. Examples thereof include cyanine dyes, phthalocyanine dyes, imidazo-quinoxaline dyes, pyrylium/thiopyrylium dyes, azulenium dyes, squalirium dyes, metallic complex salt dyes such as Ni or Cr, naphthoquinone dyes, anthraquinone dyes, indophenol dyes, indoaniline dyes, triphenylmethane dyes, merocyanin dyes, oxonol dyes, aluminum/diimmonium dyes, and nitroso-compounds. Of these dyes, cyanine dyes, phthalocyanine dyes, azulenium dyes, squalirium dyes, oxonol dyes, and imidazo-quinoxaline dyes are preferable.

Examples of the solvent for the coating solution for forming the dye recording layer include: esters such as butyl acetate or cellosolve acetate; ketones such as methyl ethyl ketone, cyclohexanone or methyl isobutyl ketone; chlorinated hydrocarbons such as dichloromethane, 1,2-dichloroethane or chloroform; amides such as dimethyl formamide; hydrocarbon such as cychlohexane; ethers such as tetrahydrofuran, ethylether, or dioxane; alcohols such as ethanol, n-propanol, isopropanol, n-butanol, or diacetone alcohol; fluorine-containing solvents such as 2,2,3,3-tetrafluoropropanol; glycol ethers such as ethylene glycol monomethyl ether, ethylene glycol monoethyl ether, or propylene glycol monomethyl ether. These may be used singly or in combination of two or more, in consideration of the solubility of the dye. The solvent is preferably a fluorine-containing solvent such as 2,2,3,3-tetrafluoropropanol. Other additives may be included as needed in the coating solution, such as anti-fading agents, binding agents, antioxidants, UV absorbents, plasticizers, and lubricants.

Examples of the anti-fading agent include nitroso compounds, metal complexes, diimmonium salts, and aminium salts, which are described in Japanese Patent Application Laid-Open (JP-A) Nos. 2-300288, 3-224793, and 4-146189.

Examples of the binding agent include: natural organic high polymers, such as gelatin, cellulose derivatives, dextran, rosin, and rubber; and synthetic organic high polymers, such as hydrocarbon resins, such as polyethylene, propylene, polystyrene and polyisobutylene, vinyl resins, such as polyvinyl chloride, polyvinylidene chloride, and a polyvinyl chloride/polyvinyl acetate copolymer, acrylic resins, such as polymethyl acrylate and polymethyl methacrylate, and also polyvinyl alcohol, chlorinated polyethylene, epoxy resins, butyral resins, rubber derivatives, and initial condensation products of thermosetting resins like phenol/formaldehyde resins. When a binding agent is used, the amount thereof is generally 0.2 to 20 parts by mass, preferably 0.5 to 10 parts by mass, and more preferably 1 to 5 parts by mass, based upon 100 parts by mass of the dye.

Figure 5B:
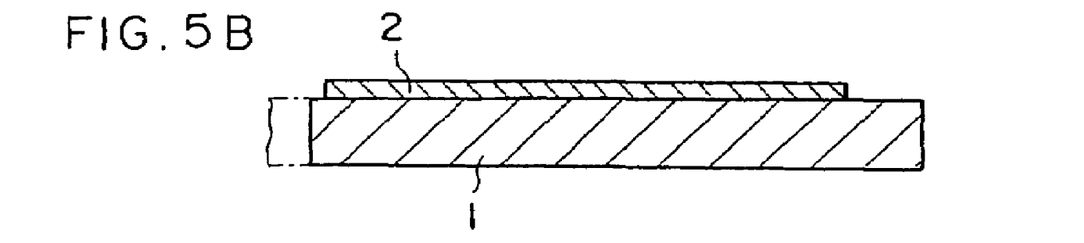

Next, as illustrated in FIG. 5B, cleaning solution is jetted from the nozzle 22 onto the outer peripheral edge of the formed dye recording layer 2, whereby the dye recording layer 2 is washed/removed from the outer peripheral edge (earlier washing). The handling mechanisms (not illustrated) move the washing device 21 and the waste recovery device 24 to predetermined positions, such as those illustrated in FIG. 1. Thus, ends of the nozzles 22 and 23 are directed towards the outer periphery so that the discharge direction of the cleaning solution and the normal line of the substrate 1 define the prescribed angle illustrated in FIG. 2. This operation is performed before the dye recording layer 2 has finished drying, so that washing is initiated within a predetermined period of time after the dye recording layer 2 has finished drying. While the spinner head 13 is being rotated, the cleaning solution (discharge amount and discharge pressure having been adjusted by the pressure tank and the valve) is obliquely discharged onto the outer peripheral edge of the dye recording layer 2 through the two nozzles 22 and 23, so that splashed cleaning solution does not adhere to the dye recording layer 2.

Figure 8:
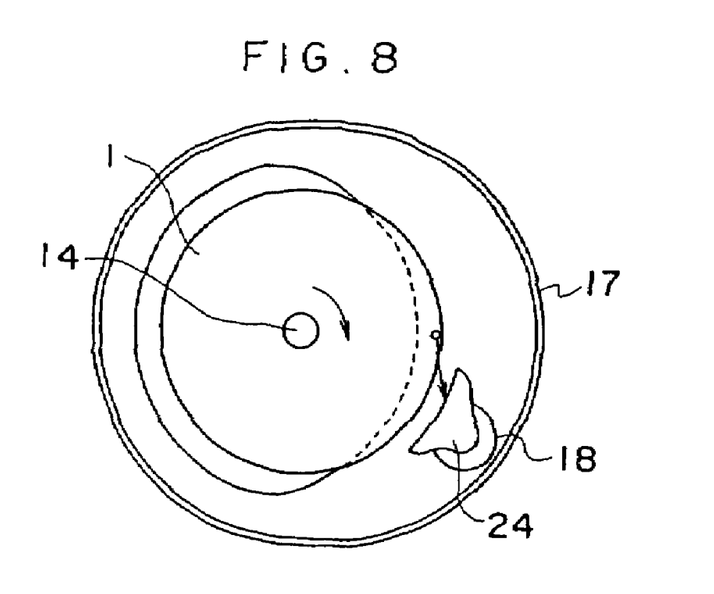
FIG. 8 is a plan view illustrating the manner in which coating solution is spun off.

FIG. 8 shows a state in which jetted cleaning solution (indicated by an arrow) is scattered by centrifugal force from the substrate 1 towards the waste recovery device 24. The cleaning solution is jetted onto a predetermined position of the outer periphery of the dye recording layer 2. Because the rotational frequency of the spinner head 13 during washing is generally set to be large, the solution (waste liquid) is, as illustrated in FIG. 8, scattered in a roughly constant direction. By disposing the waste recovery device 24 to face that direction, the cleaning solution (waste liquid) containing the dye can be recovered by the waste recovery device 24.

As mentioned previously, when the outer peripheral edge of the dye recording layer 2 is washed/removed, the surface and the reverse surface of the substrate 1 may be simultaneously washed by simultaneously operating the two nozzles 22 and 23. Alternatively, it is also possible to first wash only the reverse surface (including part of the side surface of the substrate 1) after forming the dye recording layer 2 and then, after forming the reflective layer 3, wash the outer peripheral edge of the surface of the dye recording layer 2 of the substrate 1.

Although there are no particular limitations on the cleaning solution (solvent) used for washing, examples thereof include diacetone alcohol, dibutyl ether, and 2,2,3,3-tetrafluoro-1-propanol. Diacetone alcohol is particularly preferable. These solvents are particularly effective when washing a cyanine dye recording layer. These solvents also have an advantage in that they scarcely damage the substrate even if the disc washed with these solvents is stored for a long period of time.

In order to enhance washing efficiency, washing is preferably conducted within 1.0 to 300 seconds, and more preferably within 3 to 100 seconds, after the coating layer serving as the dye recording layer 2 is formed. When washing is initiated earlier than 1.0 seconds, the shape of the edge of the dye recording layer 2 is compromised due to insufficient drying of the dye recording layer 2. When washing is initiated later than 300 seconds, it becomes difficult to remove the dye recording layer 2 and may result in an inability to completely remove the dye recording layer 2 from the outer periphery of the substrate 1.

Discharge time of the cleaning solution is preferably 0.1 to 1.5 seconds, more preferably 0.2 to 1.2 seconds, and even more preferably 0.3 to 1.0 seconds. The amount of cleaning solution discharged is preferably 0.2 to 3.0 ml, more preferably 0.4 to 2.0 ml, and even more preferably 0.6 to 1.5 ml. The pressure at which the cleaning solution is discharged is preferably 0.3 to 3.0 kg/cm$^2$, more preferably 0.5 to 2.0 kg/cm$^2$, and even more preferably 0.7 to 1.7 kg/cm$^2$, to prevent the cleaning solution from being splattered.

Discharge pressure can be adjusted in accordance with the diameter of the nozzle, and the product of the nozzle diameter and discharge pressure is preferably 0.2 to 2.4 mm·kg/cm$^2$, more preferably 0.3 to 1.0 mm·kg/cm$^2$, and even more preferably 0.4 to 0.6 mm·kg/cm$^2$.

The rotational frequency of the spinner head 13 at the time discharge of the cleaning solution begins is set to be 1000 to 10000 rpm, so that the cleaning solution is not splashed onto the area of the dye recording layer 2 that is not to be removed. Preferably, the rotational frequency is 2000 to 8000 rpm, and more preferably 3000 to 6000 rpm. The rotational frequency of the spinner head 13 at the time the cleaning solution is being spun off of the substrate is preferably 3000 to 10000 rpm, more preferably 4000 to 8000 rpm, and even more preferably 5000 to 7000 rpm.

Figure 5C:
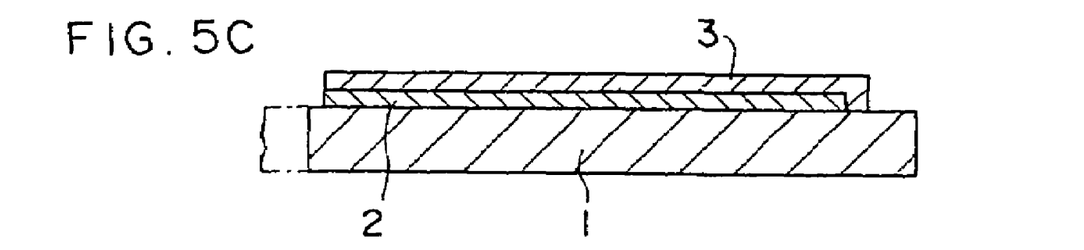

Next, as illustrated in FIG. 5C, the reflective layer 3 is disposed on the dye recording layer 2 to enhance reflectance, particularly when information recorded on the disc 30 is reproduced. The material forming the reflective layer 3 comprises a substance having a high reflectance with respect to laser light. Examples thereof include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, metalloids, and stainless steel. Preferable examples include Cr, Ni, Pt, Cu, Ag, Au, Al, and stainless steel. These materials may be used singly or in combination of two or more. Alternatively, they may be used in the form of alloys. Au, Ag, or alloys thereof are especially preferable. The reflective layer 3 can be formed by, for example, depositing, sputtering, or ion-plating the light reflective material on the recording layer 2. The thickness of the reflection film is generally 10 to 800 nm, preferably 20 to 500 nm, and even more preferably 50 to 300 nm.

After the reflective layer 3 has been formed, washing may be performed by jetting the cleaning solution from the nozzles 22 and 23 of the washing device 21 onto the outer peripheral edge (non-recording region) where the substrate has been exposed by removal of the dye recording layer 2. Washing the non-recording region can be performed in substantially the same manner as washing/removing the outer peripheral edge of the dye recording layer 2.

Figure 9:
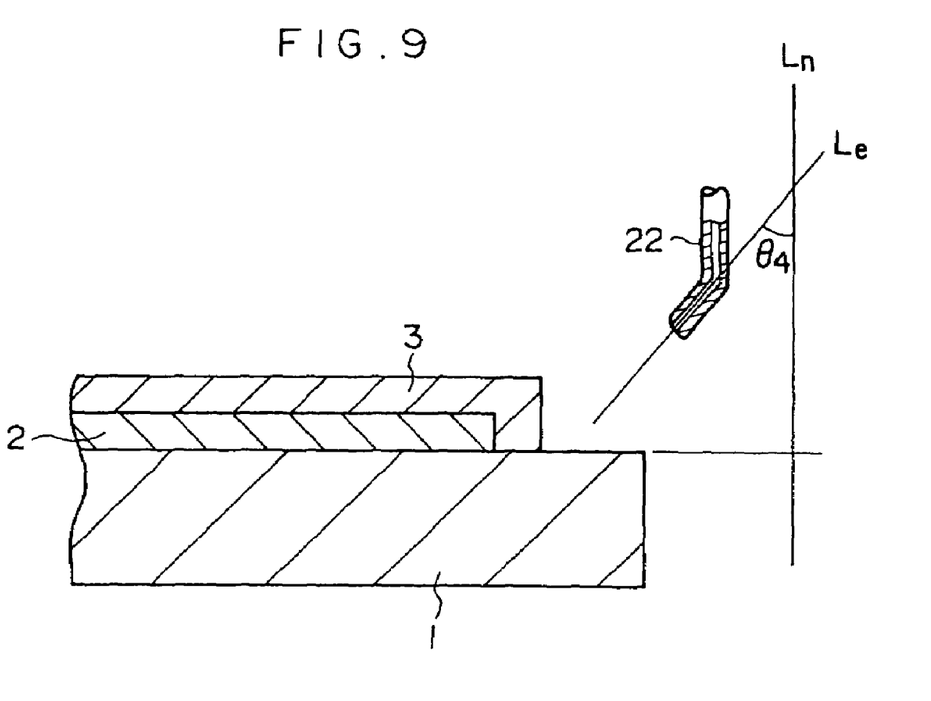
FIG. 9 is a sectional view illustrating a position at which the nozzle is disposed when washing a non-recording region.

As illustrated in FIG. 2, when washing/removing the outer peripheral edge of the dye recording layer 2, ends of the nozzles 22 and 23 are directed towards the outer periphery from the center of the substrate 1. However, when washing the non-recording region, it is preferable for the mouth of the nozzle 22 (and 23) to be disposed to the outer side of the substrate 1 and facing the inner periphery, as illustrated in FIG. 9. By disposing the nozzle 22 in this manner, it is possible to reliably wash the substrate 1 up to the boundary between the substrate land the reflective layer 3. It should be noted that the configuration of the nozzle 22 is not limited as long as the conditions below concerning the discharge direction of the cleaning solution are satisfied, even when washing the non-recording region. Washing may even be performed using the straight nozzle 22' illustrated in FIG. 3.

Figure 10:
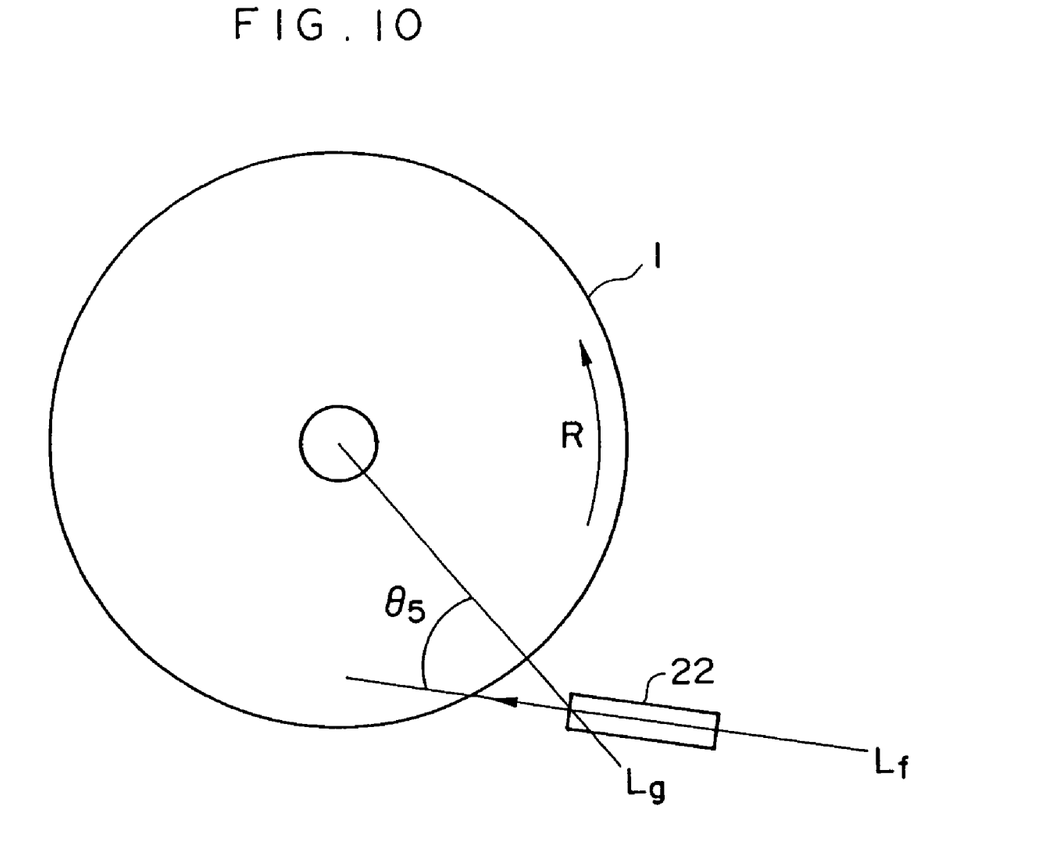
FIG. 10 is a plan view illustrating a position at which the nozzle is disposed when washing the non-recording region.

FIGS. 9 and 10 illustrate the position at which the nozzle 22 is disposed when washing the non-recording region as respectively seen in an enlarged sectional view and a schematic planar view. The view in FIG. 9 is seen from the side of a plane that extends in the normal line direction of the substrate 1 and includes the straight line representing the direction in which the cleaning solution is discharged from the nozzle 22. Although FIG. 9 only illustrates the position at which the nozzle 22 is disposed, the nozzle 23 may be disposed at a position similar to the one illustrated in FIG. 2 to thereby wash the reverse surface of the substrate.

As illustrated in FIG. 9, when the non-recording region is washed, the nozzle 22 is preferably disposed so that an angle $\theta_4$ defined by the intersection between a discharge direction $L_e$ of the cleaning solution and the normal line $L_n$ of the substrate 1 is 0 to 60°, and more preferably 10 to 45°. The angle at which the nozzle 22 (and 23) is bent is adjusted to meet this condition. When the straight nozzle 22' is used, the angle at which that nozzle 22' is disposed is adjusted to meet the same condition.

The range of the angle $\theta_4$ is defined on the plane that extends in the normal line direction of the substrate 1 and includes the straight line representing the discharge direction of the cleaning solution.

As illustrated in FIG. 10, when the substrate 1 is seen in planar view, the nozzle 22 (and 23) is disposed so that an angle $\theta_5$, which is defined by the intersection between a discharge direction $L_f$ (which is opposite to the direction of rotation R) of the cleaning solution and a straight line $L_g$ connecting the center of the substrate 1 and the mouth of the nozzle 22, is preferably 0 to 60°, and more preferably 10 to 45°.

The distance from the mouth of the nozzle 22 to the substrate 1 is preferably 0.3 to 5.0 mm, more preferably 0.5 to 3.0 mm, and even more preferably 0.7 to 2.0 mm. The diameter of the nozzle 22 is preferably 0.1 to 0.8 mm, and more preferably 0.2 to 0.6 mm, in order to stably discharge the cleaning solution.

The rotational frequency of the spinner head 13 at the time discharge of the cleaning solution is initiated is 3000 rpm or less in order to reliably wash the dye recording layer 2 adhering to the outer peripheral edge. Additionally, it is preferable for the rotational frequency to become 50% or less than the rotational frequency of the spinner head 13 when discharge is initiated for washing/removing the outer peripheral edge of the dye recording layer 2.

Figure 5D:
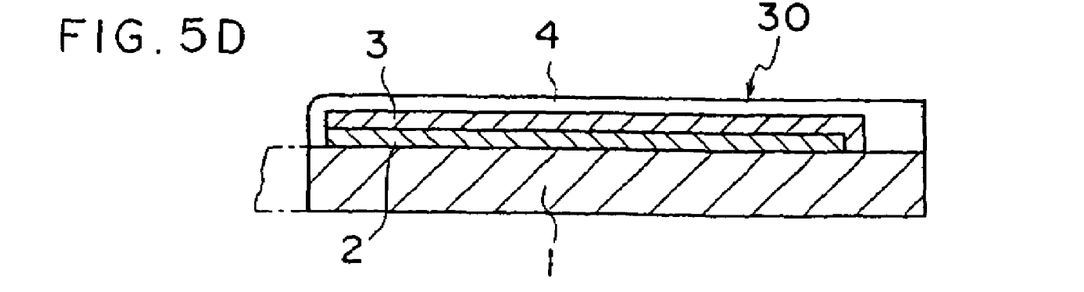

As illustrated in FIG. 5D, the protective layer 4 is disposed on the reflective layer 3 to physically and chemically protect the dye recording layer 2. The protective layer 4 can also be disposed on the side of the substrate 1 where the dye recording layer 2 is not disposed, in order to improve resistance to damage and moisture. Examples of material usable for the protective layer 4 include inorganic substances such as SiO, $SiO_2$, $MgF_2$, $SnO_2$, and $Si_3N_4$, and also organic substances such as thermoplastic resins, thermosetting resins and UV-curable resins.

The protective layer 4 can be formed by, for example, laminating a film obtained by extruding plastic material onto the reflective layer 3 and/or the substrate 1, with an adhesive therebetween. The protective layer 4 may also be disposed by vacuum deposition, sputtering, or coating. When the protective layer 4 comprises a thermoplastic resin or thermosetting resin, the protective layer 4 can be formed by dissolving the thermoplastic or thermosetting resin into a suitable solvent to prepare a coating solution, and thereafter coating the solution and allowing it to dry. When the protective layer 4 comprises a UV-curable resin, the protective layer 4 can be formed by using the UV-curable resin as it is or by dissolving it into a suitable solvent to prepare a coating solution, and thereafter coating the solution and curing the same by irradiating the solution with UV light. Additives such as anti-static agents, antioxidants, and UV absorbents may be added to the solution as needed. The protective layer 4 generally has a thickness of 0.1 to 100 µm.

It should also be noted that the spin coater 10 of the invention can be used to form the undercoat and protective layers in the same manner as the dye recording layer.

Method for Producing Optical Disc (2)

A second embodiment of the method of the invention, in which the non-recording region is formed by later washing, will now be described with reference to FIGS. 11A to 11D.

Figure 11A:
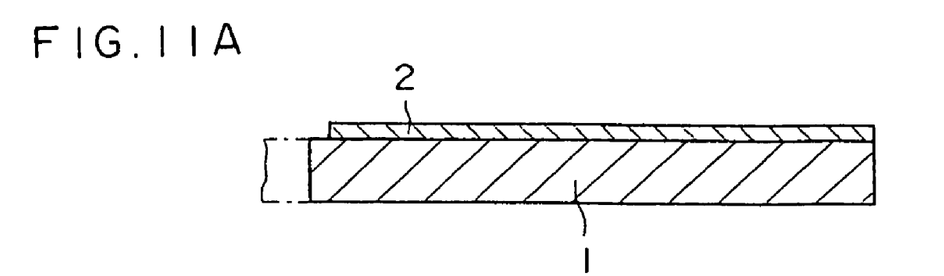
FIGS. 11A to 11D are sectional views illustrating steps in a process for producing an optical disc in accordance with a second embodiment of the invention.
Figure 11B:
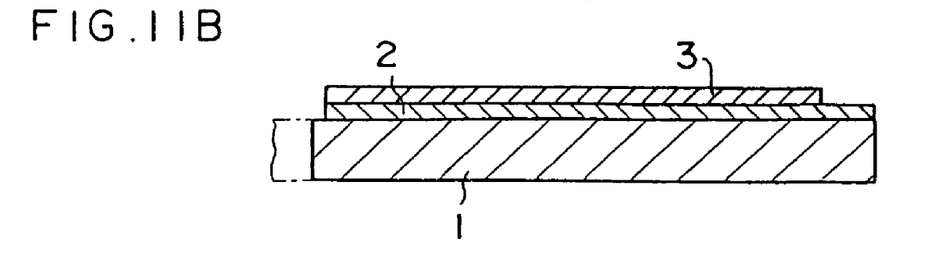

As illustrated in FIG. 11A, the dye recording layer 2 is first formed on the substrate 1 using the spin coater 10. Then, as illustrated in FIG. 11B, the reflective layer 3 is sputtered or ion-plated only on the recording region of the dye recording layer 2 (i.e., excluding the non-recording region).

Figure 11C:
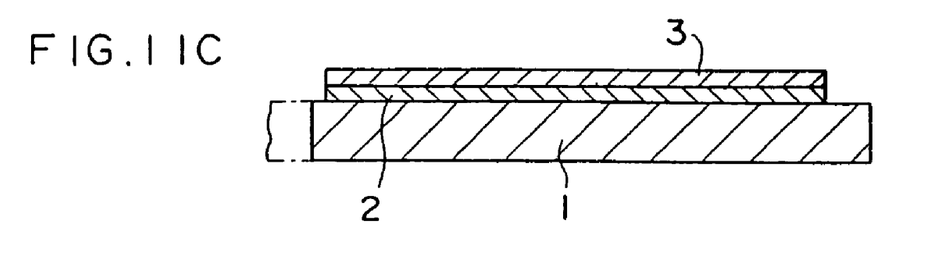

Thereafter, as illustrated in FIG. 1C, the outer peripheral edge (the non-recording region) of the dye recording layer 2 is washed/removed (later washing) with the washing device 21 of FIG. 2 having the nozzles 22 and 23. Unless otherwise indicated, the later washing is performed in the same manner as the earlier washing described above, with the washing device 21 and in accordance with the conditions described below.

The two nozzles 22 and 23 used in the later washing are each bent, as in the earlier washing, so that the cleaning solution is obliquely jetted onto the substrate 1. However, as long as the nozzle 22 satisfies the conditions below concerning the method by which the cleaning solution is discharged, the shape thereof is not limited. The straight nozzles 22' and 23' can also be used.

Because the nozzles 22 and 23 (or the straight nozzles 22' and 23') used in the later washing are disposed in the same manner as they are in the earlier washing, description will be given of a case where the nozzles 22 and 23 are used.

As illustrated in FIG. 2, the nozzles 22 and 23 are preferably disposed so that the angles $\theta_1$ and $\theta_2$ defined by the intersection between the discharge directions $L_a$ and $L_b$ and the normal line direction $L_n$ of the substrate 1 are each 0 to 60°, and preferably 10 to 45°. When the straight nozzles 22' and 23' are used, the angles at which they are disposed are adjusted in accordance with the angle conditions.

Although the nozzles 22 and 23 discharge the cleaning solution within the angle range described above, they are at least disposed so that they are not oriented towards the center of the substrate 1. Also, the ranges of angles $\theta_1$ and $\theta_2$ are defined on the plane that extends in the normal line direction of the substrate 1 and includes the straight line representing the discharge direction of the cleaning solution.

As illustrated in FIG. 4, the nozzle 22 (and 23) is preferably disposed so that, when seen in planar view, the angle $\theta_3$ defined by the intersection between the discharge direction $L_c$ of the cleaning solution (facing the direction of rotation R) and the straight line $L_d$ connecting the center of the substrate and the mouth of the nozzle is 0 to 60°, and more preferably 10 to 45°.

The distance from the mouth of the nozzle 22 (and 23) to the substrate 1 is preferably 0.3 to 5.0 mm, more preferably 0.5 to 3.0 mm, and even more preferably 0.7 to 2.0 mm. The diameter of the nozzle 22 is 0.1 to 0.8 mm, and more preferably 0.2 to 0.6 mm, in order to stably discharge the cleaning solution.

By using the nozzles 22 and 23 (or the straight nozzles 22' and 23') satisfying these conditions, as illustrated in FIG. 11C, the dye recording layer 2 can be removed from the non-recording region.

In order to enhance washing efficiency, washing is preferably conducted within 1.0 to 300 seconds, and more preferably within 3 to 100 seconds, after the reflective layer 3 is formed. When washing is initiated earlier than 1.0 seconds, the shape of the edge of the dye recording layer 2 is compromised due to insufficient drying of the dye recording layer, and may lead to edge peeling. When washing is initiated later than 300 seconds, it becomes difficult to remove the dye recording layer 2 by washing due to the dye recording layer 2 being overdried, and may result in an inability to completely remove the dye recording layer 2 from the outer periphery of the substrate 1 by washing.

Discharge time of the cleaning solution is preferably 0.1 to 1.5 seconds, more preferably 0.2 to 1.2 seconds, and even more preferably 0.3 to 1.0 seconds. The amount of cleaning solution discharged is preferably 0.2 to 3.0 ml, more preferably 0.4 to 2.0 ml, and even more preferably 0.6 to 1.5 ml. The pressure at which the cleaning solution is discharged is preferably 0.3 to 3.0 kg/cm$^2$, more preferably 0.5 to 2.0 kg/cm$^2$, and even more preferably 0.7 to 1.7 kg/cm$^2$, to remove the dried dye recording layer 2.

Discharge pressure can be adjusted in accordance with the diameter of the nozzle, and the product of the nozzle diameter and discharge pressure is preferably 0.2 to 2.4 mm·kg/cm$^2$, more preferably 0.3 to 1.0·mm kg/cm$^2$, and even more preferably 0.4 to 0.6 mm·kg/cm$^2$.

The rotational frequency of the spinner head 13 at the time discharge of the cleaning solution begins is set to be 1000 to 10000 rpm, so that the cleaning solution is not splashed onto the area of the dye recording layer that is not to be removed. Preferably, the rotational frequency is 2000 to 8000 rpm, and more preferably 3000 to 6000 rpm. The rotational frequency of the spinner head 13 at the time the cleaning solution is being spun off of the substrate is preferably 3000 to 10000 rpm, more preferably 4000 to 8000 rpm, and even more preferably 5000 to 7000 rpm.

Figure 11D:
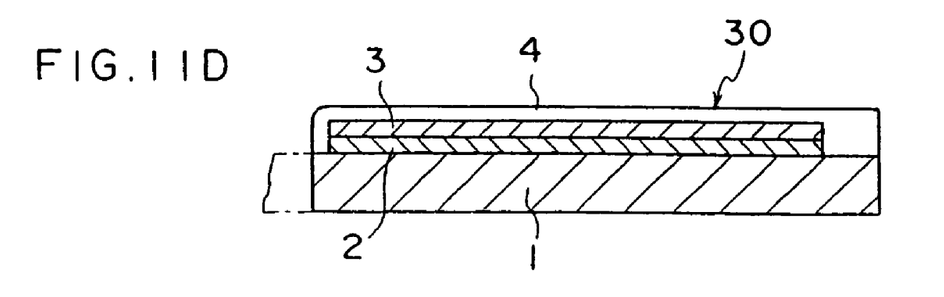

Thereafter, as illustrated in FIG. 1D, the protective layer 4 is disposed on the reflective layer 3 to physically and chemically protect the dye recording layer.

According to the methods of the invention, the direction in which the cleaning solution is discharged and other washing conditions are specified in washing/removing the dye recording layer from the outer peripheral edge of the substrate. Therefore, the non-recording region of the optical disc is completely washed and the shape of the edge is excellent. As a result, an optical disc produced according to the methods of the invention has excellent storage stability and excellent recording and playback characteristics.

EXAMPLES

The present invention will now be described in further detail by way of examples. However, the invention is not limited to these examples.

Example 1

A polycarbonate substrate (diameter: 120 mm; thickness: 1.2 mm; made by Teijin Limited; trade name: Panlite AD 5503) having formed in its surface a spiral pre-groove (track pitch: 1.6 µm; pre-groove width: 0.4 µm; pre-groove depth: 0.16 µm) was obtained by injection molding. 2.65 g of an indolenine dye (A), 0.265 g of an anti-fading agent (B), and 0.133 g of a bonding agent (made by Morton Limited, trade name: CA-139) were dissolved in 100 ml of 2, 2, 3, 3-tetrafluoropropanol using an ultrasonic vibrator (1800 W) over 10 hours, whereby a coating solution for forming a dye recording layer was prepared.

were 23° C. and 50% RH, the temperatures of the coating solution and the substrate were 23° C., and exhaust wind speed was 0.1 m/sec.

Thereafter, using the nozzle 22 of the washing device 21 illustrated in FIG. 2, the outer peripheral edge of the dye recording layer was washed/removed to thereby form a non-recording region. The washing conditions were as shown in Table 1, and diacetone propanol was used as the cleaning solution.

TABLE 1

| | Example 1 | Comparative Example 1 | Comparative Example 2 | Comparative Example 3 | Comparative Example 4 | Example 2 | Example 3 |
|---|---|---|---|---|---|---|---|
| $\theta_1(°)$ | 10 | 10 | 10 | −30 | 70 | 10 | 10 |
| $\theta_3(°)$ | 0 | 0 | 0 | 0 | 0 | −30 | 70 |
| Number of nozzles | 1 | 1 | 1 | 1 | 1 | 1 | 1 |
| Discharge pressure (kg/cm$^2$) | 1 | 1 | 1 | 1 | 1 | 1 | 1 |
| Nozzle diameter (mm) | 0.3 | 0.3 | 0.3 | 0.3 | 0.3 | 0.3 | 0.3 |
| Discharge time (s) | 0.5 | 0.5 | 0.5 | 0.5 | 0.5 | 0.5 | 0.5 |
| Rotational frequency during discharge (rpm) | 6000 | 6000 | 6000 | 6000 | 6000 | 6000 | 6000 |
| Rotation time during discharge (s) | 0.8 | 0.8 | 0.8 | 0.8 | 0.8 | 0.8 | 0.8 |
| Rotational frequency during spin off (rpm) | 6000 | 6000 | 6000 | 6000 | 6000 | 6000 | 6000 |
| Rotation time during spin off (s) | 0.5 | 0.5 | 0.5 | 0.5 | 0.5 | 0.5 | 0.5 |
| Discharge amount (ml) | 0.9 | 0.9 | 0.9 | 0.9 | 0.9 | 0.9 | 0.9 |
| Lapse of time after forming recording layer (s) | 30 | 500 | 0.1 | 30 | 30 | 30 | 30 |

Indolenine dye (A)

Anti-fading agent (B)

The coating solution was spin-coated on the entire surface having the pre-groove of the polycarbonate substrate, with rotational frequency being varied from 300 rpm to 4000 rpm, and dried to thereby form the dye recording layer (pre-groove interior thickness: approximately 200 nm). The conditions under which the dye recording layer was formed were as follows. Atmospheric temperature and humidity Next, a reflective layer having a thickness of 150 nm was formed by sputtering Ag onto the dye recording layer. A UV-curable resin (trade name: SD-318; made by Dainippon Ink and Chemicals, Inc.) was spin-coated on the reflective layer while rotational frequency was varied from 50 rpm to 5000 rpm. Ultraviolet rays were then irradiated from a high pressure mercury lamp to thereby cure the UV-curable resin and form a protective layer having a thickness of 8 µm.

A CD-R optical information recording medium (disc) comprising the substrate having disposed thereon the dye recording layer, the light reflective layer, and the protective layer was thereby produced (CD-R of Example 1). The non-recording region of the obtained CD-R was completely washed and the configuration of the edge portion was excellent. Also, a test for storability was conducted by storing the CD-R at 80° C. and in 85% humidity for 100 hours. Recording and playback characteristics of the CD-R were evaluated before and after the test for storability using a machine for evaluation "OMT2000" (made by Pulsteck Limited). The CD-R had excellent storage stability and excellent recording/playback characteristics.

Examples 2 and 3

Optical information recording media (CD-Rs) of Examples 2 and 3 were produced in the manner as in Example 1, except that washing conditions were changed as shown in Table 1.

The non-recording region of the CD-R of Example 2 was completely washed, and the shape of the edge was excellent. Slight splattering of the cleaning solution was observed, but not to the extent that would present a practical problem. The non-recording region of the CD-R of Example 3 was completely washed, and the shape of the edge was slightly compromised but not to the extent that would present a practical problem.

Comparative Examples 1 to 4

Optical information recording media (CD-Rs) of Comparative Examples 1 to 4 were produced in the same manner as in Example 1, except that washing conditions were changed as shown in Table 1.

The non-recording regions of the CD-Rs of Comparative Examples 1 and 4 could not be sufficiently washed, and it was visually confirmed that dye remained in the non-recording region. It was also confirmed that the shape of the edge of the CD-R of Comparative Example 2 was compromised. With respect to the CD-R of Comparative Example 3, splattering could not be sufficiently prevented and, although evaluation was conducted in the same manner as in Example 1, recording errors occurred at the outer periphery.

Example 4

A polycarbonate substrate (diameter: 120 mm; thickness: 1.2 mm; made by Teijin Limited; trade name: Panlite AD 5503) having formed in its surface a spiral pre-groove (track pitch: 1.6 µm; pre-groove width: 0.4 µm; pre-groove depth: 0.16 µm) was obtained by injection molding. 2.65 g of the indolenine dye (A) shown above, 0.265 g of the anti-fading agent (B) shown above, and 0.133 g of a binding agent (made by Morton Limited; trade name: CA-139) were dissolved in 100 ml of 2, 2, 3, 3-tetrafluoropropanol using an ultrasonic vibrator (1800 W) over 10 hours, to thereby prepare a coating solution for forming a recording layer.

The coating solution was spin-coated on the entire surface having the pre-groove of the polycarbonate substrate, with rotational frequency being varied from 300 rpm to 4000 rpm, and dried to thereby form the dye recording layer (pre-groove interior thickness: approximately 200 nm). The conditions under which the dye recording layer was formed were as follows. Atmospheric temperature and humidity were 23° C. and 50% RH, the temperatures of the coating solution and the substrate were 23° C., and exhaust wind speed was 0.1 m/sec.

Next, a reflective layer having a thickness of 150 nm was formed by sputtering Ag onto the recording region of the dye recording layer (and not the non-recording region).

Thereafter, using the nozzle 22 of the washing device 21 illustrated in FIG. 2, the outer peripheral edge of the dye recording layer was washed/removed to thereby form a non-recording region. The washing conditions were as shown in Table 2, and diacetone propanol was used as the cleaning solution.

TABLE 2

|  | Example 4 | Comparative Example 5 | Comparative Example 6 | Comparative Example 7 | Comparative Example 8 | Example 5 | Example 6 |
|---|---|---|---|---|---|---|---|
| $\theta_1(°)$ | 40 | 40 | 40 | −30 | 70 | 40 | 40 |
| $\theta_3(°)$ | 0 | 0 | 0 | 0 | 0 | −30 | 70 |
| Number of nozzles | 1 | 1 | 1 | 1 | 1 | 1 | 1 |
| Discharge pressure (kg/cm$^2$) | 1.5 | 1.5 | 1.5 | 1.5 | 1.5 | 1.5 | 1.5 |
| Nozzle diameter (mm) | 0.4 | 0.4 | 0.4 | 0.4 | 0.4 | 0.4 | 0.4 |
| Discharge time (s) | 0.9 | 0.9 | 0.9 | 0.9 | 0.9 | 0.9 | 0.9 |
| Rotational frequency during discharge (rpm) | 450 | 450 | 450 | 450 | 450 | 450 | 450 |
| Rotation time during discharging (s) | 0.1 | 0.1 | 0.1 | 0.1 | 0.1 | 0.1 | 0.1 |
| Rotational frequency during spin off (rpm) | 5900 | 5900 | 5900 | 5900 | 5900 | 5900 | 5900 |
| Rotation time for spin off (s) | 1 | 1 | 1 | 1 | 1 | 1 | 1 |
| Discharge amount (ml) | 0.8 | 0.8 | 0.8 | 0.8 | .8 | 0.8 | 0.8 |
| Lapse of time after forming reflective layer (s) | 10 | 500 | 0.15 | 10 | 10 | 10 | 10 |

Next, a UV-curable resin (trade name: SD-318; made by Dainippon Ink and Chemicals, Inc.) was spin-coated on the reflective layer while rotational frequency was varied from 50 rpm to 5000 rpm. Ultraviolet rays were then irradiated from a high pressure mercury lamp to thereby cure the UV-curable resin and form a protective layer having a thickness of 8 µm.

A CD-R optical information recording medium (disc) comprising the substrate having disposed thereon the dye recording layer, the light reflective layer, and the protective layer was thereby produced (CD-R of Example 4). The non-recording region of the obtained CD-R was completely washed and the configuration of the edge portion was excellent. Also, a test for storability was conducted by storing the CD-R at 80° C. and in 85% humidity for 100 hours. Recording and playback characteristics of the CD-R were evaluated before and after the test for storability using a machine for evaluation "OMT2000" (made by Pulsteck Limited). The CD-R had excellent storage stability and excellent recording/playback.

Examples 5 and 6

Optical information recording media (CD-Rs) of Examples 5 and 6 were produced in the same manner as in Example 4, except that washing conditions were changed as shown in Table 2.

The non-recording regions of the CD-Rs of Examples 5 and 6 were completely washed, and the shapes of their edges were compromised, although not to the extent that would present a practical problem.

Comparative Examples 5 to 8

Optical information recording media (CD-Rs) of Comparative Examples 5 to 8 were produced in the same manner as in Example 4, except that washing conditions were changed as shown in Table 2.

The non-recording regions of the CD-Rs of Comparative Examples 5, 8 and 9 could not be sufficiently washed, and it was visually confirmed that dye remained in the non-recording regions. With respect to the CD-R of Comparative Example 6, it was confirmed that the shape of its edge was compromised.

What is claimed is:

1. A spin coater for coating a solution for forming a dye recording layer of an optical disc, comprising:
    a spinner head for holding and rotating a substrate;
    an applicator for applying a coating solution to a surface of the substrate;
    a scatter-preventing wall for preventing the coating solution spinning off from the substrate from being scattered;
    a first washing device for jetting a cleaning solution onto an outer peripheral edge of the surface of the substrate in a discharge direction at an acute angle to at least one of a normal line and a straight line connecting a center of the substrate and a discharge mouth of the first washing device;
    a device for recovering the cleaning solution; and
    an exhaust device for allowing air to circulate in the spin coater;
    wherein: when the substrate is viewed from above, a virtual line that extends in the discharge direction is located on a rotation direction side of the straight line connecting the center of the substrate and the discharge mouth of the first washing device;
    the acute angle defined between the straight line and the virtual line is greater than 0° and not more than 60°; and
    the acute angle is defined on a side of the virtual line opposite the center of the substrate; and
    wherein the discharge mouth of the first washing device is arranged above the substrate inside the outer peripheral edge of the substrate when the substrate is viewed from above, and said discharge direction is in said rotation direction.

2. The spin coater of claim 1, wherein the acute angle defined between the discharge direction of the cleaning solution and the normal line of the substrate is greater than 0° and not more than 40°.

3. The spin coater of claim 1, wherein the distance from discharge mouth of the first washing device to the substrate is 0.3-5.0 mm.

4. The spin coater of claim 1, wherein the discharge mouth of the first washing device comprises a nozzle with a diameter of 0.1-0.8 mm.

5. The spin coater of claim 1, wherein:
    the distance from the discharge mouth of the first washing device to the substrate is 0.7-2.0 mm; and
    the discharge mouth of the first washing device comprises a nozzle with a diameter of 0.2-0.6 mm.

6. The spin coater of claim 1, wherein the acute angle defined between the straight line and the virtual line is 10-45°.

7. The spin coater of claim 1, further comprising a second washing device, for jetting a cleaning solution onto an outer peripheral edge of a back surface of the substrate.

8. The spin coater of claim 1, wherein the first washing device comprises a nozzle having a bent tip portion.

9. A spin coater for coating a solution for forming a dye recording layer of an optical disc, comprising:
    a spinner head for holding and rotating a substrate;
    an applicator for applying a coating solution to a surface of the substrate;
    a scatter-preventing wall for preventing the coating solution spinning off from the substrate from being scattered;
    a first washing device for jetting a cleaning solution onto an outer peripheral edge of the surface of the substrate;
    a device for recovering the cleaning solution; and
    an exhaust device for allowing air to circulate in the spin coater;
    wherein: the first washing device jets a cleaning solution in a discharge direction at an angle greater than 0°0 and not more than 40° to a normal line, and, when the substrate is viewed from above, at an angle greater than 0°0 and not more than 60° to a straight line connecting a center of the substrate and a discharge mouth of the first washing device; and
    wherein the discharge mouth of the first washing device is arranged above the substrate inside the outer peripheral edge of the substrate when the substrate is viewed from above, and the discharge direction is in the rotation direction.

* * * * *